US011113664B2

(12) United States Patent
Brahmbhatt et al.

(10) Patent No.: US 11,113,664 B2
(45) Date of Patent: Sep. 7, 2021

(54) DATA PROVISIONING SYSTEM AND METHOD

(71) Applicant: MORGAN STANLEY SERVICES GROUP INC., New York, NY (US)

(72) Inventors: Suryakant Brahmbhatt, New York, NY (US); Nandakumar Rampura, South Brunswick, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 16/702,897

(22) Filed: Dec. 4, 2019

(65) Prior Publication Data

US 2021/0174302 A1    Jun. 10, 2021

(51) Int. Cl.
*G06Q 10/10* (2012.01)

(52) U.S. Cl.
CPC ................... *G06Q 10/10* (2013.01)

(58) Field of Classification Search
CPC ...... G06F 21/105; G06F 6/258; G06F 16/258; G06F 16/9536; G06Q 10/10
See application file for complete search history.

(56) References Cited

U.S. PATENT DOCUMENTS

| 2006/0173985 | A1 | 8/2006 | Moore |
| 2007/0168370 | A1 | 7/2007 | Hardy |
| 2011/0066589 | A1 | 3/2011 | Chang et al. |
| 2012/0310969 | A1* | 12/2012 | Heidasch ............ G06F 16/367 707/769 |
| 2015/0261507 | A1* | 9/2015 | Bhagavan ................ G06F 8/33 717/113 |
| 2016/0021181 | A1 | 1/2016 | Ianakiev et al. |
| 2016/0306857 | A1* | 10/2016 | Barsness .......... G06F 16/24568 |
| 2016/0335454 | A1 | 11/2016 | Choe et al. |
| 2016/0343037 | A1 | 11/2016 | Nicholas et al. |
| 2017/0237616 | A1 | 8/2017 | Akella et al. |
| 2018/0081879 | A1 | 3/2018 | Lontchar et al. |
| 2018/0096417 | A1* | 4/2018 | Cook ................. G06Q 30/0631 |
| 2018/0232425 | A1* | 8/2018 | Das ..................... G06F 16/2471 |
| 2020/0026710 | A1* | 1/2020 | Przada .................. G06F 16/254 |
| 2020/0104731 | A1* | 4/2020 | Oliner .................. G06F 16/245 |

* cited by examiner

*Primary Examiner* — Albert M Phillips, III
*Assistant Examiner* — Courtney Harmon
(74) *Attorney, Agent, or Firm* — Weitzman Law Offices, LLC

(57) ABSTRACT

The invention relates to a computer-implemented system and method for provisioning data to data consumers within a business or organization. The method may include the steps of: providing a user interface for the data consumers that presents them with a data catalog identifying various data sources available to the data consumer and an electronic data request form, and presenting a data owner in the organization with options for specifying access to their data. The method may also include providing a data preparation module that includes an interface to the data sources, a data entitlement module to control the types of data presented to the data consumer, and a semantic layer that replaces technical terms associated with the data sources with non-technical descriptions of the available data. The method may also include automatically provisioning the requested data to the data consumers using an auto code generation function.

24 Claims, 7 Drawing Sheets

Data Availability Reporting   Figure 6

DATA AVAILABILITY IN AE

| TABLE | FREQUENCY | SOURCE | RANGE FROM | RANGE TO |
|---|---|---|---|---|
| FA MASTER | (m) | FA COMP | JAN 02, 2009 | CURRENT |
| PLATFORM TYPES | (☏) | AE | MAY 1, 2011 | CURRENT |
| PRODUCT PLR | (m) | AE | MAY 1, 2010 | CURRENT |
| ASSET HIERARCHY | (m) | AE | MAY 1, 2010 | CURRENT |
| GRAYSTONE FA | (m) | FCG | JUN 01, 2012 | CURRENT |
| MSTAR FUND FAMILY | (w) | FCG | AUG 01, 2012 | CURRENT |
| PRE-SPLIT REVENUE | (m) | FA COMP | | |
| POST-SPLIT REVENUE | (m) | FA COMP | | |
| PRE-SPLIT ASSETS | (m) | RTA | | |

LEGEND

| | Feed Frequency |
|---|---|
| (m) | Monthly Feed |
| (d) | Daily Feed |
| (☏) | On Demand |
| (w) | Weekly Feed |

DATA PROVISIONING SYSTEM AND METHOD

FIELD OF THE INVENTION

The present invention relates generally to data provisioning, and more particularly to a self-service data provisioning system and method for distributing data resources of an enterprise or organization to its data consumers.

BACKGROUND

Most businesses and organizations maintain numerous databases, data sources, and other repositories containing a wide variety of valuable business information. However, while some users have the experience and credentials to access certain databases, most users fall far short of being able to take full advantage of the data resources of their business or organization. For example, users commonly do not know where to obtain certain datasets that may be available to them, cannot easily access or request that data, cannot easily understand the definition and context of the data, and are not able to quickly provision available datasets. As a result, data provisioning is typically a resource-intensive process due to multiple cycles between the business users and the information technology (IT) staff.

Numerous other challenges exist in data provisioning, such as duplication of data through creation of multiple feeds for similar data requirements, storage of provisioned data in multiple locations, sub-optimal security of data distribution across platforms, inability of the IT staff to track who has access to which domain data or to trace data issues to the source, and lack of consistent governance on data usage by downstream users. As a result, there is commonly a lack of reusability of existing extracts, an excess of data that is distributed due to oversubscription, and a lack of inventory as to who is accessing certain data. These and other drawbacks exist in known systems.

SUMMARY

According to one embodiment, the invention relates to a computer-implemented method for provisioning data to a plurality of data consumers in an organization. The method may comprise: providing a portal comprising a user interface, wherein the user interface is displayed on a computer display and is designed to: (a) present a data consumer in the organization with a data catalog identifying a plurality of data types available to the data consumer, and an electronic data request form, (b) present a data provider in the organization with options for specifying access to the data provider's data according to different categories of data consumers; and (c) present a data steward in the organization with options to view and govern use of the data by the data consumers. The method may also comprise providing a data preparation module, wherein the data preparation module is programmed to (x) provide an interface to the data sources, (y) provide a data entitlement module to control the types of data presented to the data consumer, and (z) provide a semantic layer that decouples a data source data structure from a data consumer data structure. Additionally, the method may include providing a metadata module that collects and stores metadata associated with the data sources and that updates the data catalog based on the metadata. The method may also include providing a data publishing module that receives data from the data sources and provisions the data to the data consumers based on the request of the data consumer, wherein the data publishing module uses an auto code generation module to automatically generate code to execute the data provisioning.

The invention also relates to a computer-implemented system for provisioning data to a plurality of data consumers in an organization, and a computer-readable medium (e.g., software) for executing the data provisioning methods described herein.

Exemplary embodiments of the invention may include additional functionalities that facilitate secure data provisioning to data consumers in an organization. For example, the system may further comprise a recommendation module that is programmed to determine recommended data for a data consumer such as recommended attributes, tables, or data sets, and present the recommended data to the data consumer via the portal. The semantic layer may be designed to facilitate the data consumer's understanding of the available data by replacing technical terms associated with the data sources with non-technical descriptions of the data that is more easily understood by the data consumer. The data preparation module may include a query builder, an SQL parser, and an SQL editor to automatically transform a data request by a data consumer in natural language form to a properly formatted query for the data sources. The system may utilize a centralized organization metadata model using pre-existing metadata repositories associated with the data sources, and the metadata module may include a data lineage module that collects and stores metadata on upstream processes and systems that generate data.

Overall, exemplary embodiments of the invention can reduce cycle time for deployment through a self-service portal, automate the underlying code generation and deployment process, reduce or minimize data redundancy, centralize data governance and management, provide a consistent data governance process to approve data requests, enable reusability of existing feeds to eliminate duplicate feeds, and automate steps to create new feeds. These and other advantages will be further described in the detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 6 illustrates an example of a user interface for data availability reporting according to an exemplary embodiment of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

Figure 1:
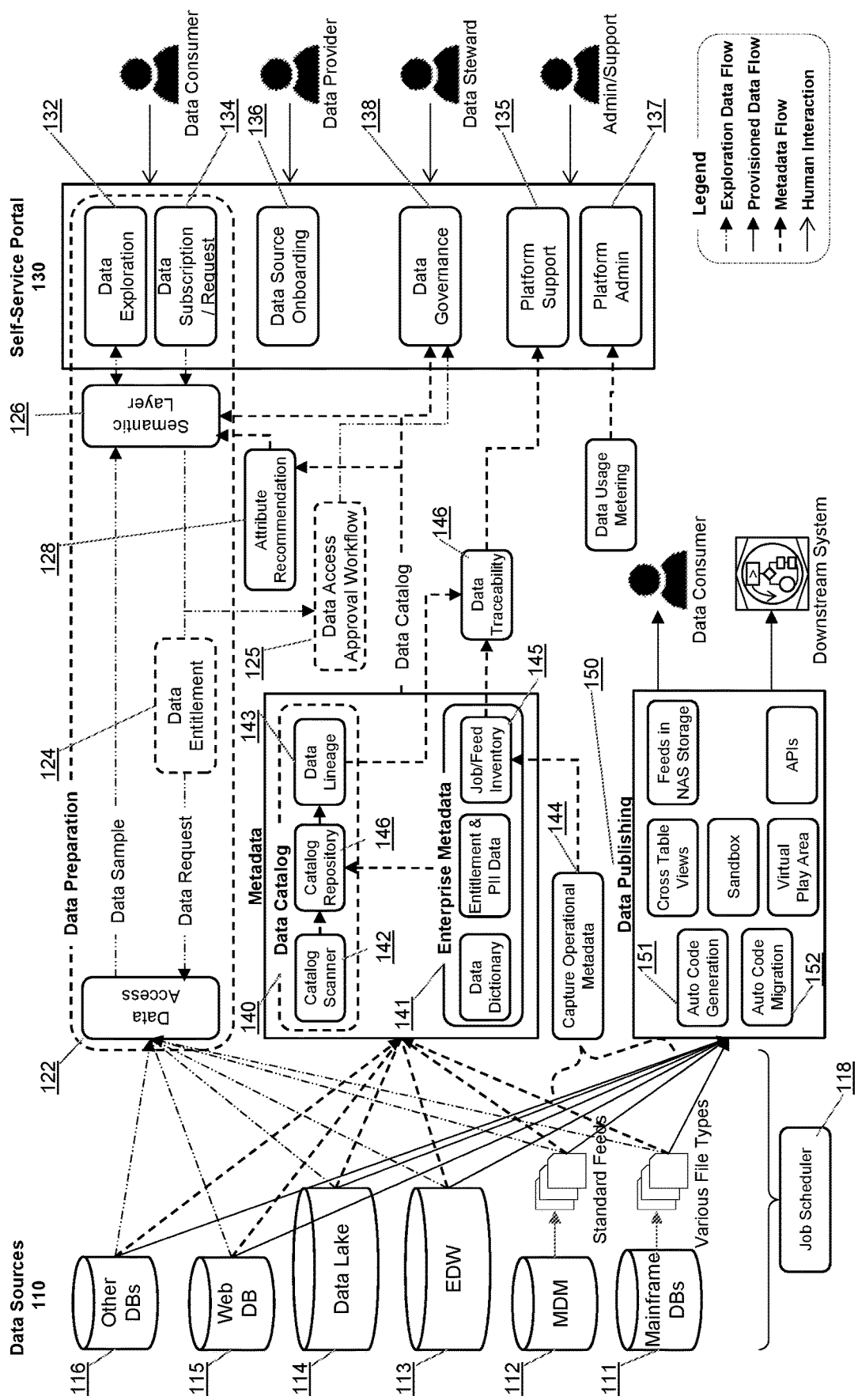
FIG. 1 illustrates an example of data provisioning system architecture according to an exemplary embodiment of the invention.

Referring now to the drawings, FIG. 1 illustrates an example of a data provisioning system architecture according to an exemplary embodiment of the invention. As shown in FIG. 1, the data provisioning system 100 includes a number of components and functionalities, including a number of data sources 110, a data preparation component 120, a self-service portal 130, a data catalog 140, and a data publishing component 150. These components, and the other components and modules shown in FIG. 1, may comprise, for example, one or more computer servers or other computer processors running software and storing data to carry out the functionalities that are described herein. As used herein, the term "module" generally refers to a software module that may run on a computer processor.

The various data sources, modules, processors, servers, and other components illustrated in FIG. 1 may be connected by one or more networks. The networks may comprise any one or more of the Internet, an intranet, a Local Area Network (LAN), a Wide Area Network (WAN), an Ethernet connection, a WiFi network, a Global System for Mobile Communication (GSM) link, a cellular phone network, a satellite communications network, or other network, for example.

The data sources 110 include the various databases, data repositories, and other data sources that are maintained by the enterprise or organization. The data sources 110 may include, for example, one or more mainframe databases 111, a master data management (MDM) database 112, an enterprise data warehouse (EDW) 113, a data lake 114, a web database 115, and other databases or repositories 116.

The data provisioning system 100 can provide data consumers within an organization significantly enhanced visibility and access to the data of the organization using a self-service data request process. According to one embodiment, the self-service data request process may include the steps of data exploration, a data subscription/request and data request status review. These steps may be enabled using a combination of a user-friendly user interface, a semantic metadata layer, application programming interface (API) services, data entitlements, and a data access approval workflow.

As shown in FIG. 1, the data preparation component 120 includes a data access module 122. The data access module 122 comprises an interface that enables the data preparation component 120 to connect to the various data sources 110 in the enterprise to allow data consumers to explore and subscribe to or request data from one or more of the data sources. The interface may comprise software that interfaces to the individual data sources 110 and may execute various transformations to normalize or standardize the data format for use by the data preparation module 120.

The data entitlements module 124 shown in FIG. 1 controls access by different users, or categories of users, to various types of data. For example, users who have entitlements to access production data are permitted by the data entitlements module 124 to explore production data. If a user does not have entitlements to production data, then the data entitlements module 124 allows the user to explore non-production data. Production data is masked in a non-production environment.

The data preparation component 120 also includes a semantic layer 126. As will be described further below, the semantic layer 126 provides functionality to present the data that is available to a particular data consumer in a form that is understandable to the data consumer. The semantic layer 126 can also hide or unhide certain tables or attributes (e.g., attributes may be specific columns in a table that define a certain data field) to manage what each data consumer is able to see for exploring the data and requesting data. The semantic layer 126 can also decouple data source focused data structure changes from the data consumer focused data structure.

The self-service portal 130 includes components that enable a data consumer to explore the various types of data that are available to him or her, and to request or subscribe to certain data sets. The self-service portal 130 may comprise a computer server, such as a web server, and software that provides a graphical user interface (GUI) or other user-friendly interface. The data consumer can access the self-service portal 130 using a personal computing device such as a desktop computer, laptop computer, tablet computer, or mobile phone, for example.

As shown in FIG. 1, the self-service portal 130 includes a data exploration module 132. The data exploration module 132 may comprise, for example, a web-based interface that presents the various datasets, tables, attributes, views, and/or feeds available to the particular data consumer in a manner that is easily understandable to the data consumer, who may be a non-technical business user according to one example. The data exploration module 132 enables the data consumer to begin his or her data exploration by searching a data catalog across multiple data sources to find the available data assets such as tables, views and feeds where a particular data attribute is available. Typically, a significant amount of the data of an enterprise or organization is stored in relational databases that comprise tables. An attribute generally refers to a column in a table that defines a particular data field. A view generally refers to data in a table or other format that a user can view or pull by accessing the table or database. A feed generally refers to a dataset that is pushed to the user automatically, e.g., on a periodic basis or upon a predefined event. The data catalog comprises a catalog of the data available to a data consumer.

The data exploration module 132 allows data consumers to explore sample data from all available data sources 110 irrespective of the data consumer's access entitlements. The data exploration module 132 determines whether to allow the data consumer user to explore production or non-production data based on data entitlements. According to one embodiment, for each attribute, the data exploration module 132 presents to the data consumer the business and technical names for the attribute, a description of the attribute, the data type, a data health metric, a data certification status, and full table production data profiles. The self-service portal 130 can provide a continuous user experience flow for data consumers at a single site. It enables data exploration using multiple functionalities, including data cataloging, metadata management, data preparation, and the functionality of the semantic layer 126.

The self-service portal 130 also includes a data request module 134 according to one embodiment of the invention. The data request module 134 may comprise, for example, a web-based interface that enables the data consumer to request or subscribe to one or more tables, attributes, feeds, views, and/or other data sets available to the particular data consumer. The self-service data subscription functionality can provide the advantage of promoting the reusability of existing data feeds, as opposed to creating new feeds in every instance. For example, the data request module 134 can propose to the data consumer one or more available, existing data feeds that closely match what the data consumer has requested. According to one embodiment, the data request module uses an attribute (data field) level search to identify if there are existing feeds that have already been created by other users or by the firm/database engineers and to predict if existing feeds including a similar data set are already present and to prompt the data consumer with the possible suggestions. Moreover, the data request module allows the data consumer to search the existing feeds to determine if a feed that already matches their data requirement exists in the data repository of the data provisioning system. The re-use of existing data feeds can provide the advantage of facilitating the data consumer's data request, since the data consumer will often be satisfied with an existing data feed that he or she didn't know existed. The re-use of existing data feeds can also reduce the burden that would result from creating new feeds for all or most data requests from data consumers.

According to one embodiment, the data request module 134 allows a data consumer to submit a data request for various data sets or subscribe to various data feeds. The data request module 134 provides functionality to receive a data request from the data consumer in natural language form or keywords via a user-friendly web-based user interface, and to execute the data request in an asynchronous mode to create a data feed or view to provision the requested data as a feed or table view. According to one embodiment, the data provisioning system provides the data consumers with a web based user friendly interface where the user can drag and drop the data attributes required and also apply filters on data attributes as required. The data provisioning system then translates the selected attributes into a SQL query that is, in turn, submitted to the database. According to one embodiment, the component that performs this function is the query builder that is part of the data request module 134. According to a preferred embodiment, the data request module 134 includes a query builder, an SQL editor, and an SQL parser. The data requests are SQL query based according to a preferred embodiment. The data request module 134 may include an SQL parser to parse SQL queries to identify certain types of attributes, such as sensitive or confidential attributes. The data request module 134 can also allow the data consumer to save work-in-progress queries for updating at a later time. The recipe of the data request can be stored as an SQL query.

The data request module 134 can also include functionality to allow a data consumer to check on the status of his or her submitted data request with respect to obtaining required approvals and the completion of provisioning the data. In addition, the data provisioning system 100 allows an administrator or support team to review the data request and make modifications to the SQL query to improve or optimize it according to an exemplary embodiment of the invention.

As shown in FIG. 1, the data provisioning system 100 may also include an attribute recommendation module 128. The attribute recommendation module 128 may include a recommendation engine that recommends attributes that may be of interest to the data consumer based on past attribute usage for data exploration and relationships between the attributes. According to one embodiment, the attribute recommendation module 128 utilizes a recommendation engine to predict attributes that may be of interest to the data consumer. The attribute recommendation engine may include a computer model such as a machine learning model or deep learning model that uses training data to teach the model. The training data may comprise various data attributes or elements that relate certain types of data consumers with data sets that they commonly request or use. The attribute recommendation engine also uses an automated chat based approach (e.g., using a chatbot) to help data consumers identify the data attributes that are needed by using natural language processing (NLP) tools to translate questions asked in English and provide them with a list of tables and attributes that match their data requirements. For example, if a data consumer makes a request such as "I need all clients that have assets greater than a million dollars," the system will utilize a chatbot to provide the data consumer with the tables and attributes that they can use to obtain client details and the tables and attributes that contain the assets information which the data consumer can then use to create his or her requests.

The self-service portal 130 can provide the advantage of enabling data consumers with or without any knowledge of software coding to explore and subscribe or request data for analysis and decision making. According to a preferred embodiment, the data consumers have a single common platform to access all enterprise data.

The data provisioning system 100 can enable self-service data provisioning by creating and governing a data catalog 140 of various data sources across the enterprise. A centralized enterprise metadata model 141 can be used to create the semantic layer 126 to control the metadata that data consumers are permitted to see. According to one embodiment, the data provisioning system is used to catalog all the technical and business metadata, along with data profile and data location information for the data sources 110 that are included in the data provisioning system 100. According to one embodiment, the data catalog is created by a catalog scanner 142 that scans the database(s) metadata and merges it with a centralized data model which contains the business definition for all the data attributes. This merged data is then stored in the catalog repository 146 which is made available to the data consumer through the semantic layer 126. As shown in FIG. 1, the data catalog 140 includes a catalog scanner 142, a catalog repository 146, and a data lineage component 143.

The data catalog 140 comprises a combination of multiple metadata information about the data sources 110. According to a preferred embodiment, the data catalog 140 integrates with multiple metadata repositories (e.g., metadata repositories associated with each data source 110) and data catalog tools (e.g., a data catalog tool configured for use with one of the data sources 110) to capture all the required metadata and centralize it in the data catalog 140 for data exploration and request by data consumers. Integration of the data catalog 140 with existing metadata repositories and data catalog tools allows the data provisioning system 100 to take advantage of any existing investment made by an organization in building metadata repositories for each data source 110. The data catalog 140 can also provide additional functionalities such as a centralized metadata model and management process, a metadata management user interface (UI), and the ability to generate and store full table data profiles, data health metrics, and data certification status as desired to enhance the information available on each table and attribute.

The data catalog 140 also comprises an enterprise metadata component 141, which may include a data dictionary, entitlement data, personally identifiable information (PII) data, and a job/feed inventory. The data dictionary comprises definitions for the various data fields and attributes in the system. The entitlement data defines and identifies confidential or sensitive information that may require entitlements for access as well as business rules for various levels of access based on the data consumer's role and title and the various types of data. The PII data defines and identifies personally identifiable information, the use of which may be regulated by various laws and regulations such as GLB, HIPAA and GDPR. The job/feed inventory comprises operational metadata on the various jobs and feeds that have been established for data consumers.

The centralized metadata model can provide the ability to hide or unhide certain tables or attributes to manage what the data consumers are able to see for exploring the data and requesting it. The semantic layer 126 receives metadata from the data catalog 140 and can be programmed to decouple data source focused data structure changes from the end user focused data structure. According to one embodiment, the semantic layer comprises a web layer that includes a data explorer module, a data sample viewer module, a query builder module, a data profiling module, and a data lineage explorer module.

The data explorer module allows users to explore the metadata from the data catalog and identify the data that is available. The data explorer module helps users to relate a business definition with the data elements and attributes that are available.

The data sample viewer module allows users to explore sample data sets that can help them relate the metadata from the data explorer module to the data stored in the respective data tables. The data sample viewer module helps data consumers to make educated decisions as to the data they are requesting.

The query builder module allows users to combine different data elements, filter data and create a data set to be provided by the data provisioning system in the form of feeds. The data profiling module on the semantic layer will profile the data available in the data tables and provide high level summaries like the counts on rows expected, minimum and maximum values, unique values expected in an attribute, etc.

The data provisioning system stores the lineage of data that is available in the data sources 110 in the data lineage module 143. This lineage information is made available through the data lineage explorer module of the semantic layer 126, which assists data consumers in identifying the source systems from which the data originates. The data lineage module collects and stores data that illustrates the linkage between all the systems, databases, tables, attributes and processing jobs. According to one embodiment, the data lineage explorer module includes a graphical user interface that generates and presents a pictorial representation of the dependencies between the various objects in the path of the data flow. As used herein, "object" may refer to a system, database, table, attribute, or other component that processes or stores data.

The data lineage module 143 can provide key information to facilitate impact analysis when there is an issue or problem in upstream data generation systems or processes. For example, in the case of delay in data availability or an issue with data quality in upstream systems or processes, the data lineage module 143 can assist a system administrator or other user in understanding all the downstream objects, systems and teams that may be impacted by the upstream problem. The impact analysis enabled by the data lineage model 143 allows a system administrator to notify all the impacted parties promptly with specific intelligence about the problem and impact. The data lineage module 143 can be programmed to provide automated notification to impacted teams and individuals in the organization.

The data lineage module 143 in the data catalog tools may also be designed to ingest other metadata information not available in the data catalog to enrich the data lineage module 143. This may include the attributes in the data sources 110 that may not be directly available for consumption from the self-service portal 130. This metadata is made available in order to assist the data consumer in understanding where the data set is originating from. As one example, if the data provisioning system 100 is presenting account/client attributes, these attributes will be mapped back to the client relationship management systems and account opening systems where the data for the client and account are created. Hence, the system allows the data consumer to see that the data originates from these source systems. This functionality also provides the data consumer with insight into all the various transformations that the data undergoes before being stored in the database from which the data provisioning system 100 extracts the data set.

FIG. 1 also illustrates that operational metadata 144 such as job run information, number of data rows, and soft or hard errored data rows information can be captured using other existing frameworks and tools into a common repository, such as dedicated storage space on a server. This operational metadata can then be stored in the data catalog and used along with lineage data from the data lineage module by a data traceability module to provide current intelligence to trace the upstream data processes, systems and history to provide data traceability. The system can enable the administrative support team to trace a data issue identified in a downstream system or process to its source in an upstream system or process using the data traceability module.

The data traceability module 146 can integrate data lineage data with operational metadata and actual data and provide a user interface for data traceability. The operational metadata comprises data movement/extraction transformation and load jobs that actually load the data, while the actual data refers to the actual rows in the data set that will be provided to the data consumers. The user interface may comprise a graph based lineage of the dependencies that will help the data consumer relate to the flow of data starting from the data origination to the database from which the data is extracted by the data provisioning system 100. When a user observes a data issue in a downstream system, the data lineage module can be used to identify and understand all the applicable upstream jobs, tables and systems. The data traceability module 146 allows a user to pull the data for a specific batch run using the operational metadata available, which facilitates analysis of the data for issues and problems.

The data traceability module facilitates identification of the source of the data issue. The graphical interface allows consumers to identify the source system from where the data set is sourced and hence enable them to identify the potential source of data discrepancies, if any. There interface enables consumers to know the various touchpoints that the data passes through before it is provisioned by the data provisioning system 100. The data traceability module can be designed to ingest, record, and provide data traceability data at the record level, in addition to higher levels, which allows it to address and provide traceability data relevant to production support, as well as support for regulatory audit requirements.

Referring again to FIG. 1, the self-service portal 130 includes a data governance module 138. The data governance module can facilitate appropriate access to data for groups or individuals through a structured data access request approval process. The data governance module can also govern data access by monitoring all data requests to ensure users are using the data as requested.

Figure 2:
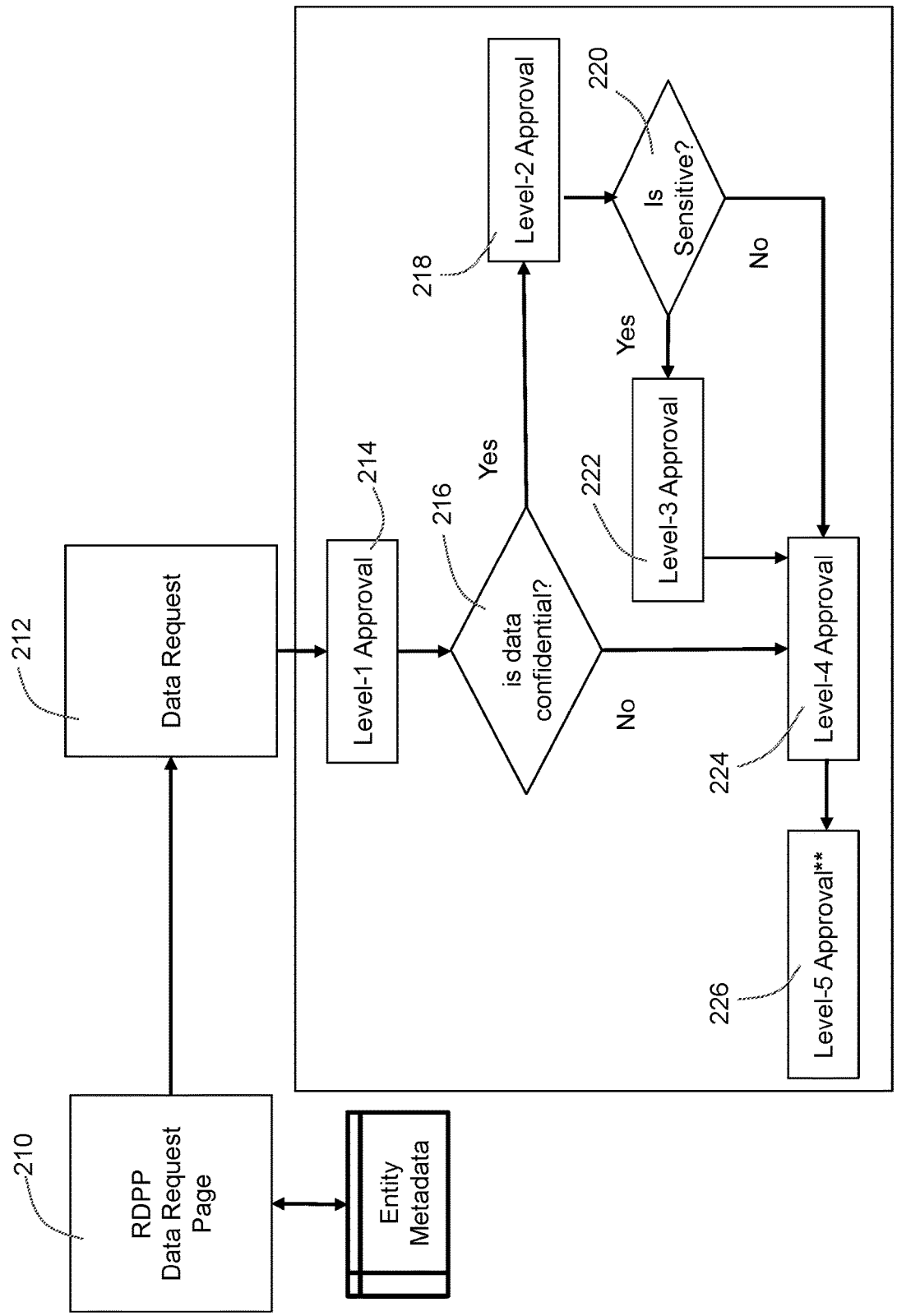
FIG. 2 illustrates a governance process and workflow for data access approval according to an exemplary embodiment of the invention.

FIG. 2 illustrates a governance process and workflow for data access approval according to an exemplary embodiment of the invention. Data consumers who need access to data will submit a data request using the data request module 134 in the self-service portal 130. The data request submitted by the data consumer follows a defined data approval process with five levels of approvers according to an exemplary embodiment of the invention. According to one embodiment, all non-confidential data requests go through three levels of approval. FIG. 2 illustrates the levels of approval.

The process starts in step 210 with the data consumer using his or her personal computing device to access the data request module 134 in the self-service portal 130. The data request module includes a user interface that allows the data consumer to request certain data feeds or views. In step 212, the data request module 134 receives input from the data consumer and formulates a data request based on the data consumer's input. The data request identifies the requested data, the data consumer, the role or title of the requesting data consumer, a reason for request, the classification of data (e.g., confidential/sensitive) and the owners of the database systems and other information related to the data request.

In step 214, the data access approval workflow module 125, which may operate in cooperation with the data entitlement module 124, executes the level 1 approval process. Level 1 approval includes an evaluation of data entitlement, wherein the approver will check if the requestor should be allowed access to the data or not. In step 216, the data access approval workflow module 125 determines whether the requested data is confidential. The data access approval workflow module 125 makes this determination based on metadata associated with the requested data that specifies whether the requested data is confidential. If the requested data is confidential, the process includes two additional levels of approval (level 2 and level 3 approvals). These two extra levels can ensure the data consumer or data consumer group requesting the data should have access to confidential and sensitive data. In step 218, the data access approval workflow module 125 determines whether the requesting data consumer is permitted to access confidential information. This determination may be based on restrictions placed on the requested data by a data provider using a data source onboarding module 136 or by a data steward using the data governance module 138.

If the requesting data consumer is permitted to access confidential information, then the process proceeds to step 220, in which the data access approval workflow module 125 determines whether the data consumer is permitted to access sensitive information. Sensitive information generally refers to confidential information that also introduces additional risks in the event of disclosure, such as reputational risks or risks that introduce potential liabilities to the organization. If the requested data is sensitive, then the process proceeds to step 222, in which the data access approval workflow module 125 determines whether the requesting data consumer is permitted to have access to sensitive information. If so, the process proceeds to level 4 approval in step 224.

Level 4 approval in step 224 involves a determination of correctness of the data requested and validates it against the business use case for which the data was requested. Level 5 approval in step 226 involves a determination of correctness of the SQL query generated and optimal usage of database resources that will be consumed while generating the data feed. The five levels of approval are designed to ensure that all data stakeholders (e.g., data providers and data stewards) have reviewed and approved the data consumer or data consumer group having access to the requested data. According to one embodiment, the data access approval workflow module 125 can be programmed to execute the approval workflow using a ticketing management module to integrate the approvals with actual execution of the data request ticket.

According to one embodiment, the self-service portal 130 includes functionality to allow the data owners and the data governance team to monitor data being made available for data consumers to access. The self-service portal 130 also includes functionality to allow data owners and the data governance team to govern definitions for the data. Data owners are able to monitor and manage tables and attributes that are made available for data consumers to access. According to one embodiment, the portal 130 allows data owners to control what data is made available and what data is hidden using status flags at the table and attribute level. The portal 130 also allows the data governance team to build and update proper definitions for each attribute and to publish it in the self-service portal 130.

The data governance process executed by the data access approval workflow module 125 can be modified to fit the business requirements for the data providers (e.g., data owners) and data consumers. The process can be customized for any data product that is used. The data governance process carried out by the system can also be configured to monitor changes to the data catalog 140 and to incorporate such changes in real time or near real time into the data governance process. This updating allows the data governance process to continue to obtain proper approvals for data access even when changes are made to the data catalog.

According to one embodiment, the data provisioning system uses an auto code generation module and auto code migration module to streamline the execution of the automated data provisioning process. These modules can be designed to provide auto code generation and auto code migration for all data provisioning requests made with the system, which eliminates the need to reengineer these functionalities for different technical environments.

The auto code generation module 151 includes various functionalities such as SQL query parsing (e.g., identify all the database names, tables names, attribute names in a SQL query SELECT clause), SQL query correction (identify SQL query syntax errors and correct them before submitting to the database), SQL query optimization (performance tune the queries respective to the database against which it will run) and automated feed operationalization (automate implementation of data feeds using a set of common scripts and control tables).

Figure 3:
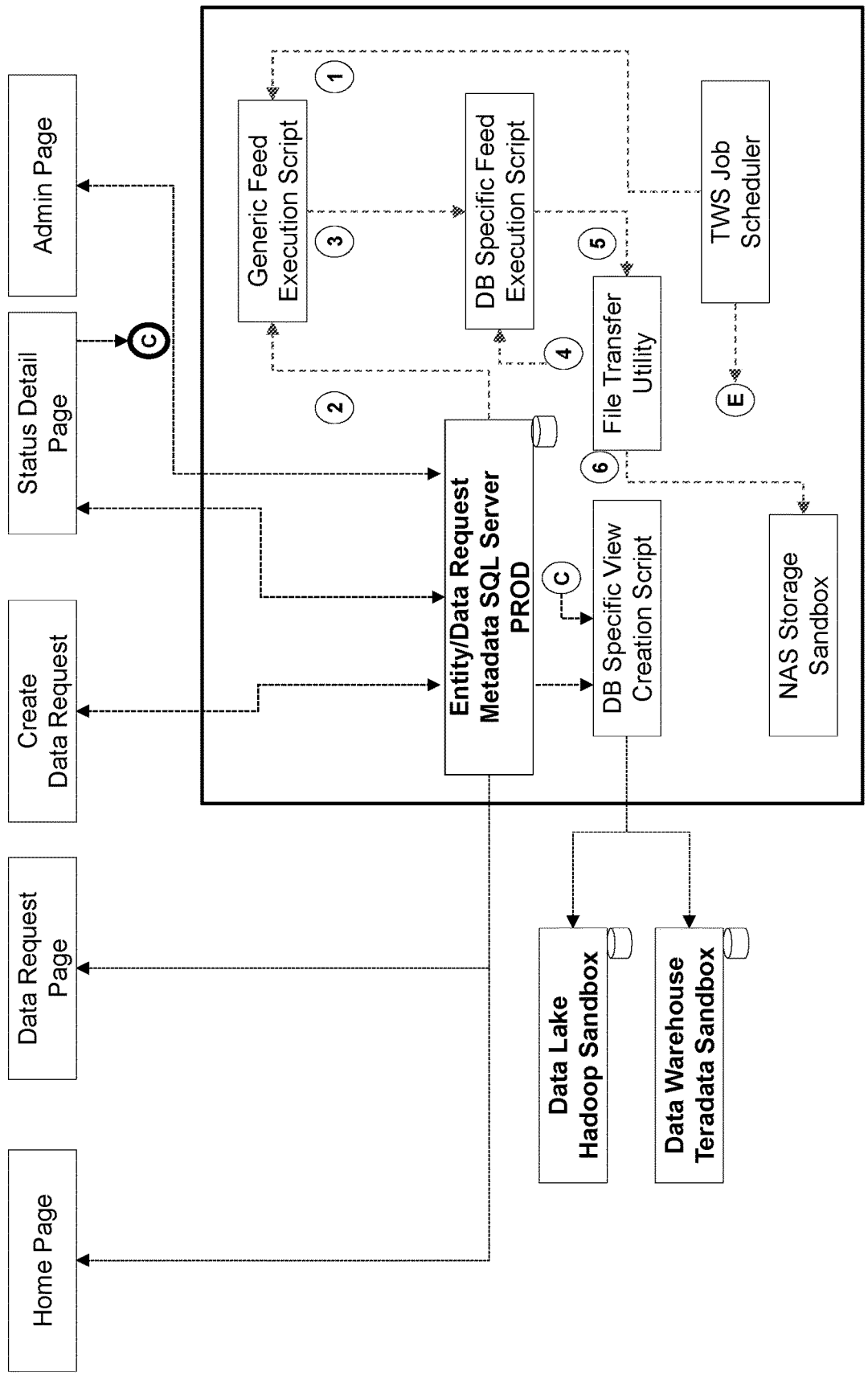
FIG. 3 illustrates a process for auto code generation to create feeds according to an exemplary embodiment of the invention.

FIG. 3 illustrates the six step process for auto generating the code to create feeds according to an exemplary embodiment of the invention.

In step 1, the data feed details are pulled from the job scheduler 118 and submitted to the RDPP processing servers. In step 2, the RDPP server will then connect to the feed metadata in the RDPP Server and extract the details of the database, tables and attributes required for the feed.

In step 3, depending upon the database the data provisional system creates a script that can be run native to the database where the data for the feed resides. This process can accommodate specific syntax requirements native to the database.

In step 4, the file transfer utility is a module that contains the feed details, such as the format of the feed (txt/Excel/flat file format) and the desired destination of the feed from where the data consumers would pick the feed created and further utilize it for their processing needs. Data from the file transfer utility is passed to the database specific script that is further enriched with the aforementioned details.

In step 5, the file transfer utility then picks the script that is created over steps 1-4 and executes the same on the database where the required dataset exists. The data is then extracted and processed to format the feeds in a way that the consumer can utilize them.

Step 6 is the final step in the feed provisioning process which picks the feed processed in step 5 and transfers it to the destination storage space where it is available for the data consumer to access the feed.

According to one embodiment, the auto code migration module 152 automates the movement of data feeds and views from a lower environment to a higher environment based on a self-service request. This process uses a set of scripts that are integrated with a technology change management (TCM) process to automate implementation and migration. The technology change management process is a process that is used to migrate software code from a development environment to a test environment and further to the production environment once testing is complete. The automated code generation and code migration process can significantly reduce the turnaround time required to provision data. In addition, as these automated steps can be monitored, the data provisioning system support team is able to improve the performance of data distribution.

Referring again to FIG. 1, the data provisioning system 100 includes a data publishing module 150 that enables the system to publish data requested in various formats. Data can be requested to be provisioned as a feed or as a table view. Feeds will be made available in network attached storage (NAS) for the downstream system to pick up. Data can be made available in a virtual play area and sandbox for fail fast data exploration. Data can also be provisioned by making API calls.

According to one embodiment, the data provisioning system 100 provides functionality for enabling impact analysis and notification. As shown in FIG. 1, the self-service portal 130 includes a platform support module 135. The platform support module can enable a data support team to analyze all processes from data ingestion to distribution during a data delay and issue identified upstream. The platform support module 135 can also allow the data support team to notify downstream users of any impact to downstream systems by utilizing the lineage data 143 and feed inventory data 145 maintained by the system. For data issues identified downstream, the data support team can use data traceability module 146 functionality to analyze the issue and identify the source of the issue. The data support team can also administer the configuration of the self-service portal 130 using a platform administration module 137.

Figure 4:
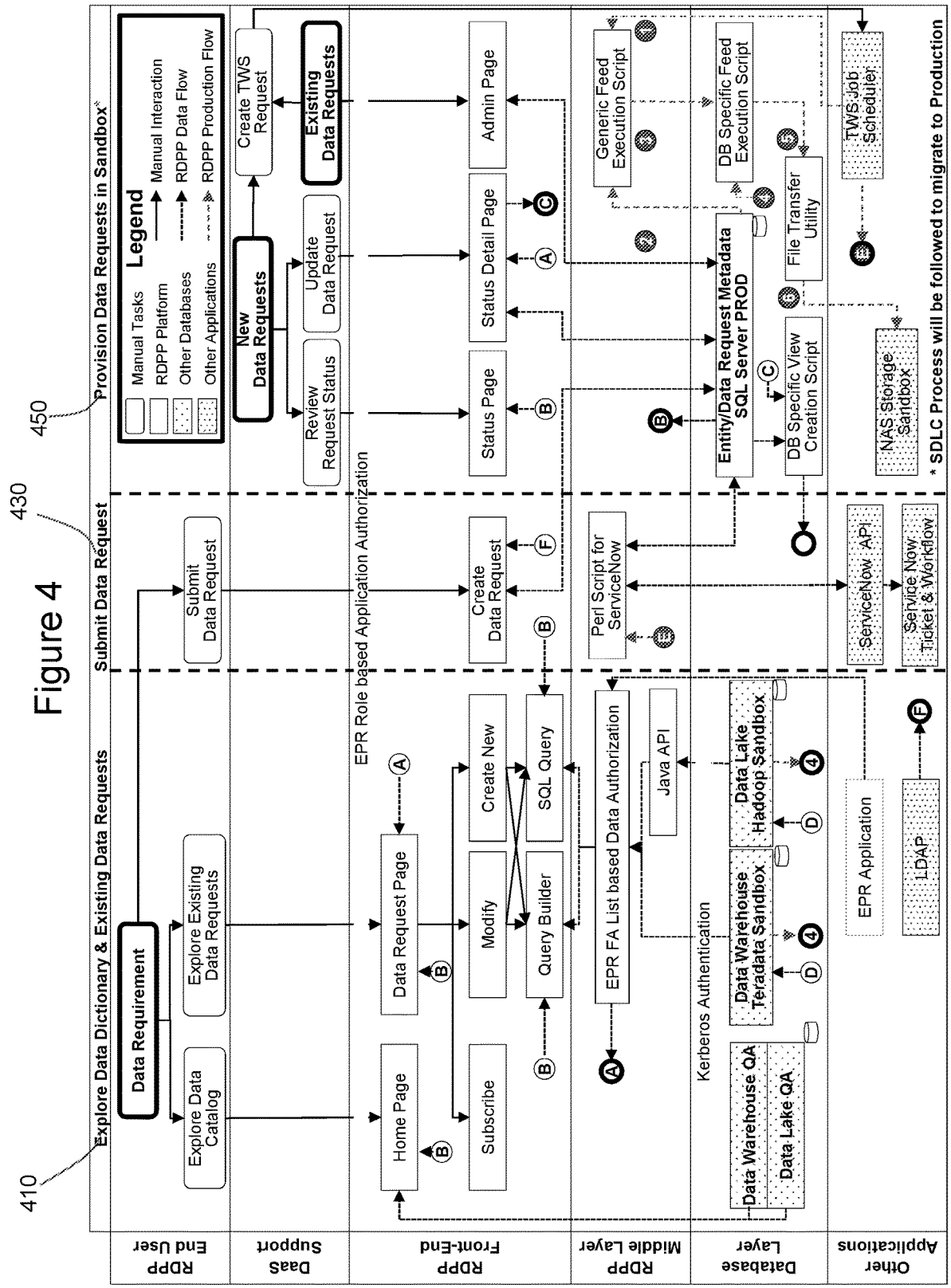
FIG. 4 illustrates a process flow for a data provisioning system according to an exemplary embodiment of the invention.

FIG. 4 illustrates the process flow for the data provisioning system according to an exemplary embodiment of the invention. The process includes three primary phases, i.e., a first phase 410 that involves exploring the data dictionary, data catalog and existing data requests, a second phase 430 that includes submission of data requests, and a third phase 450 that involves provisioning data requests. In the exploration phase 410, the data consumer who has a data requirement or request can explore the data catalog and existing data requests. The data provisional system 100 enables the data consumer to explore the data catalog via the self-service portal (home page) 130. The home page can receive the pertinent data catalog information from the data warehouse QA and data lake QA.

If the data consumer would like to explore existing data requests, he or she can visit the data request page available through the self-service portal. The data request page allows the data consumer to create a new data request, modify an existing data request, or subscribe to a data feed. As described above, the system uses SQL queries and query builders to execute the data consumer's data request. The system uses an enterprise resource planning (ERP) authorization module to control access to the database layer, which may include a data warehouse Teradata sandbox and a data lake Hadoop sandbox, according to one embodiment.

Once the data consumer has created or modified a data request, or identified a data feed to subscribe to, the system permits the data consumer to submit a data request in the data request phase 430. According to one embodiment, the request is submitted to ServiceNow through a ServiceNow application programming interface (API). The request sent contains the details of the consumers, their business use case, and the data classification. ServiceNow assigns the appropriate approvers based on the data set requested and the data classification. All approvals are tracked by the data provisioning system 100 by API calls to ServiceNow which provides the status of the requests in real time or near real time to the data consumer.

In the provisioning phase 450, new data requests are received and can be viewed on a status page, updated data requests can be viewed on a status detail page, and existing data requests can be viewed on an admin page. In the database layer, the system uses various scrips and utilities to provision the data. For example, a database specific view creation script may be used to create a database specific view. A database specific feed execution script may be used to execute a database specific feed. A file transfer utility may be used to transfer requested data files. And an entity/data request metadata SQL server for production can be used to retrieve the appropriate production data. The NAS storage sandbox is used to store the created feeds. Access to these feeds is provided to the data consumers and the data consumers can extract the feeds from the NAS storage to further process them as needed. According to one embodiment, the IBM Tivoli Work Scheduler is used to schedule the automated extract of the feeds as per the frequency of the feed requested by the data consumer.

Figure 5:
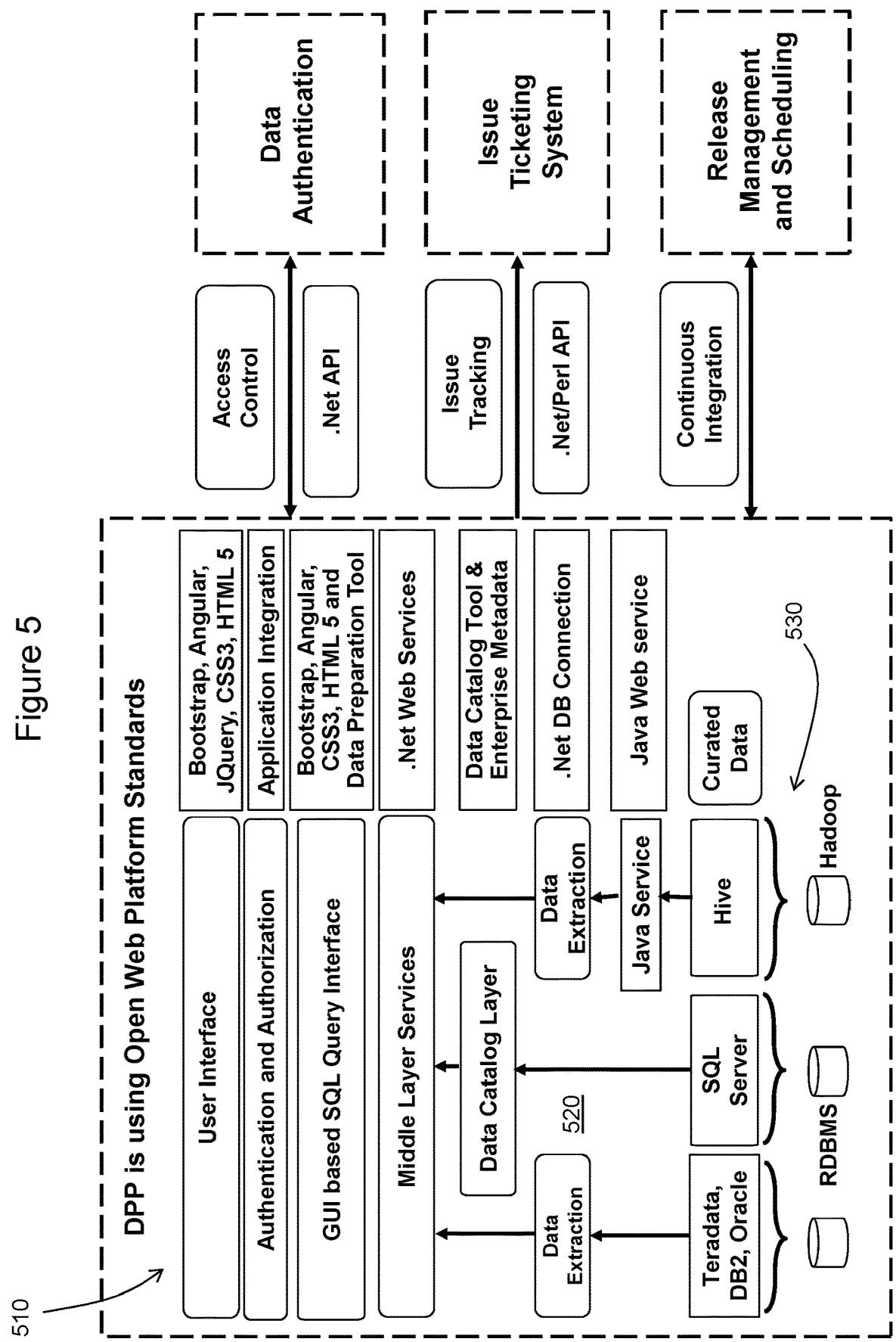
FIG. 5 illustrates a technical architecture for a data provisioning system according to an exemplary embodiment of the invention.

FIG. 5 illustrates a technical architecture for the data provisioning system according to an exemplary embodiment of the invention. As shown in FIG. 5, the system may utilize a three-tiered architecture comprising a user interface tier 510, a middle layer 520, and a database layer 530. The user interface tier 510 may include a user interface implemented with Bootstrap, Angular, JQuery, CSS3, or HTML 5, for example. The user interface layer 510 may also include an authentication and authorization module which together control access to requested data. The user interface 510 may also include a graphical user interface (GUI) based SQL query interface implemented in Bootstrap, Angular, CSS3, HTML 5, and a data preparation tool, for example. In general, the user interface tier provides an easily understandable interface to allow different types of users to perform certain permitted actions, such as explore, view, access, subscribe to, control access to, or monitor data, depending on their respective roles and permitted access rights.

The middle tier 520 of the technical architecture serves as an interface between the database tier 530 and the user interface tier 510. The middle tier provides data extraction services for a relational database management system (RDBMS) such as Teradata, DB2, or Oracle, as well as data extraction services for a Hadoop-type database with a Hive layer which provides an SQL-like interface to the Hadoop database. The middle tier 520 also provides the data catalog layer, which interfaces with the organization's SQL servers to ensure that the data catalog is up to date.

Also illustrated in FIG. 5 is a data authentication module which authenticates data for access control, an issue ticketing system which is used for issue tracking, and a release management and scheduling module, which controls the timing for releasing data to data consumers.

FIG. 6 illustrates one example of a user interface for data availability reporting according to an exemplary embodiment of the invention. The example user interface in FIG. 6 lists examples of tables that are available for a data consumer to access, such as FA master, platform types, product PLR, asset hierarchy, Graystone FA, Mstar Fund Family, pre-split revenue, post-split revenue, and pre-split assets, according to one particular example. For each table, the user interface also lists the feed frequency, which may be a monthly feed, weekly feed, daily feed, or on demand. It also lists the source of the data, e.g., FA comp, AE, FCG, and RTA, and the date range of the available data. The user interface in FIG. 6 thus presents the user with an easy to understand view of the available data feeds, as well as certain other useful parameters such as the feed frequency, data source, and date range.

Figure 7:
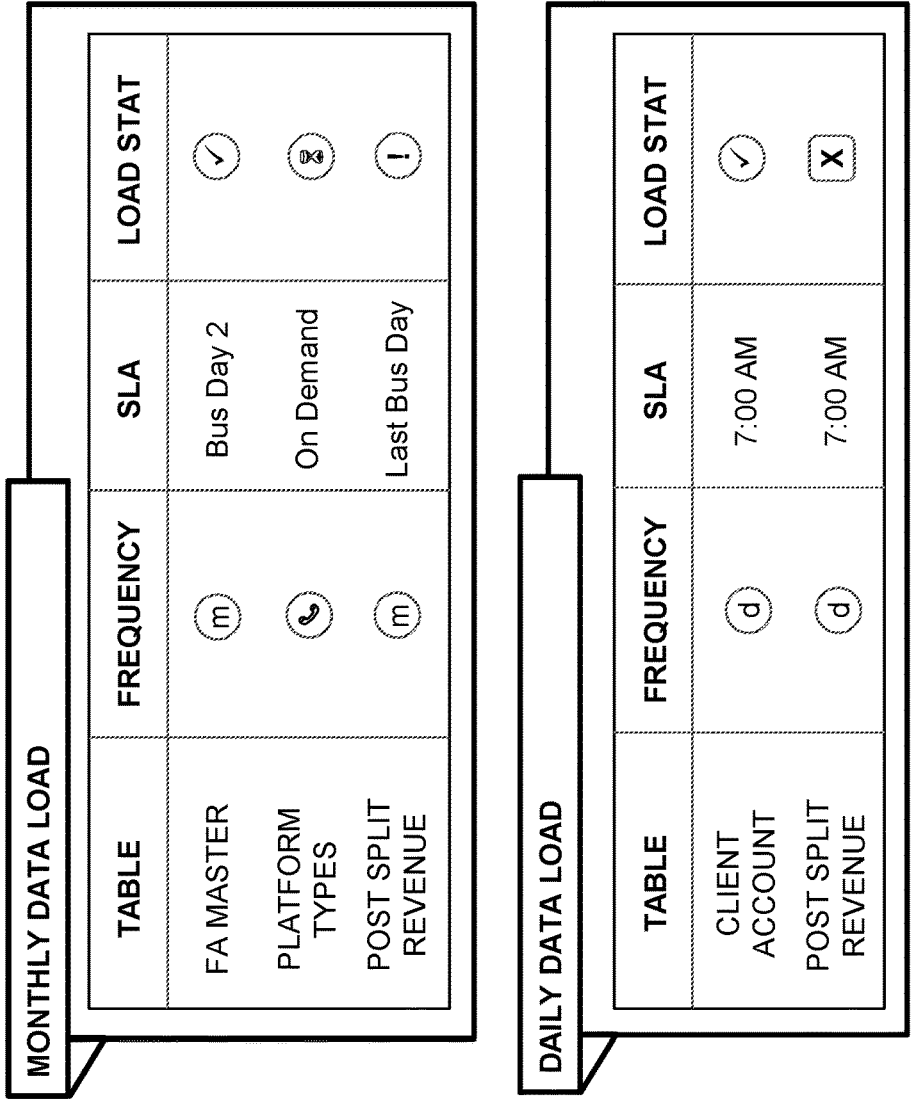
FIG. 7 illustrates an example of a user interface for load status reporting according to an exemplary embodiment of the invention.

FIG. 7 illustrates an example of a user interface for load status reporting according to an exemplary embodiment of the invention. As shown in FIG. 7, the load status reporting interface lists the relevant table where the data is stored (e.g., FA master, platform types, post split revenue, client account, etc.), along with the frequency (monthly feed, weekly feed, daily feed, or on demand), service level agreement (SLA) (e.g., business day 2, on demand, last business day, or a specific time of day), and load status (e.g., load complete, load in progress, not started, failed load). The user interface can be configured by the user to present a customized summary of the status and parameters of the user's data requests.

Exemplary embodiments of the invention can provide a number of advantages to various parties in a business or organization. For example, the data provisioning system 100 can provide standardization of the data distribution process from multiple data sources through a centralized curated catalog of data libraries. Enterprise data is consistently sourced from one platform. It provides data distribution via operational data feeds (files) and cross views. A standard framework can be used to publish consistent business rules and definitions. The system also provides automated seamless migration of data feeds and cross views from one environment to another (e.g., development, to quality assurance (QA) to production, and also from sandbox to non-production and production environments). In addition, new data consumers subscribe to existing feeds and table views in many case, rather than creating new feeds and table views.

Exemplary embodiments of the system can also provide enhanced efficiencies. For example, it can significantly reduce cycle time for software development life cycle (SDLC) deployment through the self-service interface that is intuitive, personalized and metadata driven. It also automates the underlying code generation and deployment process. Redundancy of data feeds and views is also reduced or minimized. The system also provides a consistent method using data lineage across systems to analyze impacts and send out notifications.

The system also improves data governance by centralizing the data governance and data management processes. It can reduce reconciliation oversight. Data quality checks can promote or ensure consistent application of business logic. In addition, users will have access to certain domain data and they will be able to see data only for what they have requested and are authorized to see. All data distribution will follow a similar approach to maintain data security, and all users accessing data will be logged and tracked.

The system can also benefit data providers. For example, the system provides a consistent data governance process to approve data requests and promotes reusability of existing feeds to eliminate duplicate feeds. It implements automated steps to create new feeds. It automates data issue and delay impact analysis and notification. The system makes available curated, well-defined data with consistent business rules and definitions through a centralized platform to all data consumers. Target files are stored on NAS by functional grouping. According to one example, the system maintains a seven working data history of output data files. The system provides the ability to recreate a file dynamically for past. The system provides reconciliation of records input (e.g., records read from source table) and output (e.g., record on output file) stored for every file. The system can provide alerts to users if a large deviation in data from the past appears in a data feed. The system provides automated seamless migration of data feeds and cross views from one environment to another (e.g., development to QA to production, also from sandbox to non-production and production).

The system can also provide benefits for data consumers. For example, the system provides one common platform to request all of the firm's data. It also allows data consumers to explore data using data profiles and recommendations. The system provides fast turnaround times in provisioning data requests, and it provides consistent notifications in case of delays to feeds. It also provides for flexible consumption of data using a pay per use model.

Those skilled in the art will appreciate that the diagrams discussed above are merely examples of a data provisioning system and are not intended to be limiting. Other types and configurations of networks, servers, databases and personal computing devices (e.g., desktop computers, tablet computers, mobile computing devices, smart phones, etc.) may be used with exemplary embodiments of the invention. Although the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. The components of the various embodiments may be arranged at any location or locations within a distributed network without affecting the operation of the respective system.

Although examples of servers, databases, and personal computing devices have been described above, exemplary embodiments of the invention may utilize other types of communication devices whereby a user may interact with a network that transmits and delivers data and information used by the various systems and methods described herein. The personal computing devices described above may include desktop computers, laptop computers, tablet computers, smart phones, and other mobile computing devices, for example. The servers, databases, and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device.

The servers, databases, and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software stored in the memory (e.g., non-transitory computer readable medium containing program code instructions executed by the processor) for executing the methods described herein.

Any suitable programming language may be used in accordance with the various embodiments of the invention. For example, the programming language used may include assembly language, Ada, APL, Basic, C, C++, dBase, Forth, HTML, Android, iOS, .NET, Python, Java, Modula-2, Pascal, Prolog, REXX, Visual Basic, and/or JavaScript. Further, it is not necessary that a single type of instructions or single programming language be utilized in conjunction with the operation of the system and method of the invention. Rather, a number of different programming languages may be utilized as is necessary or desirable.

The software, hardware and services described herein may be provided utilizing one or more cloud service models, such as Software-as-a-Service (SaaS), Platform-as-a-Service (PaaS), Infrastructure-as-a-Service (IaaS), and Logging as a Service (LaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents. The specification and drawings are accordingly to be regarded as an illustrative rather than restrictive sense.

What is claimed is:

1. A computer-implemented method for provisioning data to a plurality of data consumers in an organization, the method comprising:

providing a graphical user interface designed to: (a) present a data consumer in the organization with a data catalog comprising metadata that identifies a plurality of columns in a database available to the data consumer and identifies a data type of each of the plurality of columns without providing the data to the data consumer, wherein the data consists of values the plurality of columns are assigned in particular records, and wherein the data remains located on different data sources from different platforms and only the metadata for the data catalog is centralized; (b) present a data provider in the organization with options for specifying access of particular categories of data consumers to the data provider's data; (c) present a data steward in the organization with options to view and govern use of the data by the data consumers; and (d) receive input from the data consumer, provide the input to a data request module and present the data consumer with output from the data request module, wherein the data request module receives a natural language search query and a data attribute through a drag and drop feature of the user interface;

receives a modification input from the data steward, the modification input being a SQL query to optimize the search query;

identifies in data sources an existing feed that has already been produced for another data consumer, wherein the existing feed matches the search query, the modification input and the data attribute; and displays to the data consumer a message indicating that the existing feed is available;

providing a data preparation module, wherein the data preparation module is programmed to (a) provide an interface to the data sources, (b) provide a data entitlement module to control the types of data presented to the data consumer, and (c) provide a semantic layer that decouples a data source data structure from a data consumer data structure by associating a business name for each column with a technical name for that column, allowing a data consumer to use a query builder to build a query that acts upon technical names of columns while only knowing business names of columns;

providing a metadata module that collects and stores metadata associated with the data sources and that updates the data catalog based on the metadata; and providing a data publishing module that receives data from the data sources in response to the request of the data consumer and provisions data to the data consumers, wherein the data publishing module uses an auto code generation module to automatically generate code to execute the data provisioning.

2. The method of claim 1, further comprising providing a recommendation module that is programmed to:

determine recommended metadata associated with recommended data for a data consumer, wherein the recommended metadata comprises one or more columns from the metadata, or one or more tables or data sets that comprise the one or more columns; and present the recommended metadata to the data consumer via the user interface.

3. The method of claim 1, wherein the data entitlement module is programmed to:

upon selection of one or more columns identified by the metadata, obtain sample data consisting of values the one or more columns are assigned in particular records, provide the sample data to all data consumers regardless of the data consumer's access entitlement; and provide production data and non-production data from the one or more columns to data consumers based on their individual access entitlements.

4. The method of claim 1, wherein the semantic layer is programmed to replace each technical name for a column with the associated business name of that column when the query builder displays column names to the data consumer.

5. The method of claim 1, wherein the user interface is programmed to receive a request for status update from the data consumer for a data request, and to generate a status update for the data consumer regarding the data consumer's request for status update.

6. The method of claim 1, wherein the data preparation module comprises a query builder, an SQL parser, and an SQL editor to transform a data request by a data consumer to a query for the data sources.

7. The method of claim 1, wherein the metadata module implements a centralized organization metadata model using pre-existing metadata repositories associated with the data sources.

8. The method of claim 1, wherein the metadata module comprises a data lineage module that collects and stores information on upstream processes and systems that generate data.

9. The method of claim 1, further comprising a data governance module that executes a data approval process comprising detecting, based on the metadata, that underlying data is sensitive or confidential, and based on a determination of sensitivity or confidentiality, automatically creates a workflow that solicits the approval of one or more of the data stewards.

10. A computer-implemented system for provisioning data to a plurality of data consumers in an organization, the system comprising:

an electronic memory; and a processor that is programmed to:

present a graphical user interface programmed to: (a) present a data consumer in the organization with a data catalog comprising metadata that identifies a plurality of columns in a database available to the data consumer and identifies a data type of each of the plurality of columns without providing the data to the data consumer, wherein the data consists of values the plurality of columns are assigned in particular records, and wherein the data remains located on different data sources from different platforms and only the metadata for the data catalog is centralized; (b) present a data provider in the organization with options for specifying access of particular categories of data consumers to the data provider's data; (c) present a data steward in the organization with options to view and govern use of the data by the data consumers; and (d) receive input from the data consumer, provide the input to a data request module and present the data consumer with output from the data request module, wherein the data request module receives a natural language search query and a data attribute through a drag and drop feature of the user interface;

receives a modification input from the data steward, the modification input being a SQL query to optimize the search query;

identifies in data sources an existing feed that has already been produced for another data consumer, wherein the existing feed matches the search query, the modification input and the data attribute; and displays to the data consumer a message indicating that the existing feed is available;

provide a data preparation module, wherein the data preparation module is programmed to (a) provide an interface to the data sources, (b) provide a data entitlement module to control the types of data presented to the data consumer, and (c) provide a semantic layer that decouples a data source data structure from a data consumer data structure by associating a business name for each column with a technical name for that column, allowing a data consumer to use a query builder to build a query that acts upon technical names of columns while only knowing business names of columns;

provide a metadata module that collects and stores metadata associated with the data sources and that updates the data catalog based on the metadata; and provide a data publishing module that receives data from the data sources in response to the request of the data consumer and provisions data to the data consumers, wherein the data publishing module uses an auto code generation module to automatically generate code to execute the data provisioning.

11. The system of claim 10, further comprising a recommendation module that is programmed to:

determine recommended metadata associated with recommended data for a data consumer, wherein the recommended metadata comprises one or more columns from the metadata, or one or more tables or data sets that comprise the one or more columns; and present the recommended metadata to the data consumer via the user interface.

12. The system of claim 10, wherein the data entitlement module is programmed to:
   upon selection of one or more columns identified by the metadata, obtain sample data consisting of values the one or more columns are assigned in particular records, provide the sample data to all data consumers regardless of the data consumer's access entitlement; and
   provide production data and non-production data to data consumers based on their individual access entitlements.

13. The system of claim 10, wherein the semantic layer is programmed to replace each technical name for a column with the associated business name of that column when the query builder displays column names to the data consumer.

14. The system of claim 10, wherein the user interface is programmed to receive a request for status update from the data consumer for a data request, and to generate a status update for the data consumer regarding the data consumer's request for status update.

15. The system of claim 10, wherein the data preparation module comprises a query builder, an SQL parser, and an SQL editor to transform a data request by a data consumer to a query for the data sources.

16. The system of claim 10, wherein the metadata module implements a centralized organization metadata model using pre-existing metadata repositories associated with the data sources.

17. The system of claim 10, wherein the metadata module comprises a data lineage module that collects and stores information on upstream processes and systems that generate data.

18. The system of claim 10, further comprising a data governance module that executes a data approval process with a plurality of approval levels based on a title of the data consumer, whether the data is confidential, and whether the data is sensitive.

19. The system of claim 10, further comprising an interactive chat bot utility to perform natural language processing on a query from a data consumer, search the metadata for possible columns satisfying the query, and provide the possible columns to the data consumer to be approved for inclusion in provisioned data.

20. The system of claim 10, further comprising a module to offer data provisioning subscriptions in exchange for payment, track usage of the provisioned data, and provide a pay-per-use data provisioning model.

21. The system of claim 10, wherein the system further comprises an attribute recommendation engine that uses a machine learning model to predict additional attributes of use to the data consumer based on existing attributes requested by the data consumer.

22. The system of claim 10, wherein the system further comprises an enterprise metadata component that stores definitions of personally identifiable information (PII) data and ensures that the data steward has approved use of PII data in a feed before the data publishing module provisions the data.

23. The system of claim 10, wherein the system further comprises a data traceability module that responds to a data consumer's identification of a downstream data issue by generating a graph of data dependencies to show processes or sources which are potential causes of the data issue.

24. The system of claim 10, wherein the system further comprises an auto code migration module that receives a data feed created for a non-production environment and automatically generates an equivalent data feed drawing on data sources in a production environment.

* * * * *